United States Patent [19]
Escott

[11] 3,756,768
[45] Sept. 4, 1973

[54] AIR FLOW CONTROL IN SHAFT FURNACES

[75] Inventor: Robert M. Escott, Toledo, Ohio

[73] Assignees: Midland-Ross Corporation; Erie Development Company, both of Cleveland, Ohio

[22] Filed: May 11, 1972

[21] Appl. No.: 252,378

[52] U.S. Cl. .................................. 432/17, 432/79
[51] Int. Cl. ............................................ F27b 1/10
[58] Field of Search ............... 432/17, 14, 48, 51, 432/78, 79, 101

[56] References Cited
UNITED STATES PATENTS
2,739,800  3/1956  Sisco .................................. 432/79 X
3,645,514  2/1972  Lado .................................. 432/17

*Primary Examiner*—John J. Camby
*Attorney*—Malcolm R. McKinnon, Irvin L. Groh et al.

[57] ABSTRACT

Apparatus and method of controlling and distributing air in a vertical shaft furnace for indurating oxide pellets including combustion chambers for introducing heated air at opposite sides of a furnace and varying the quantity of air supplied at one side of the furnace from a minimum to a maximum quantity and simultaneously varying the air delivered at the opposite side from a maximum to a minimum quantity.

11 Claims, 2 Drawing Figures

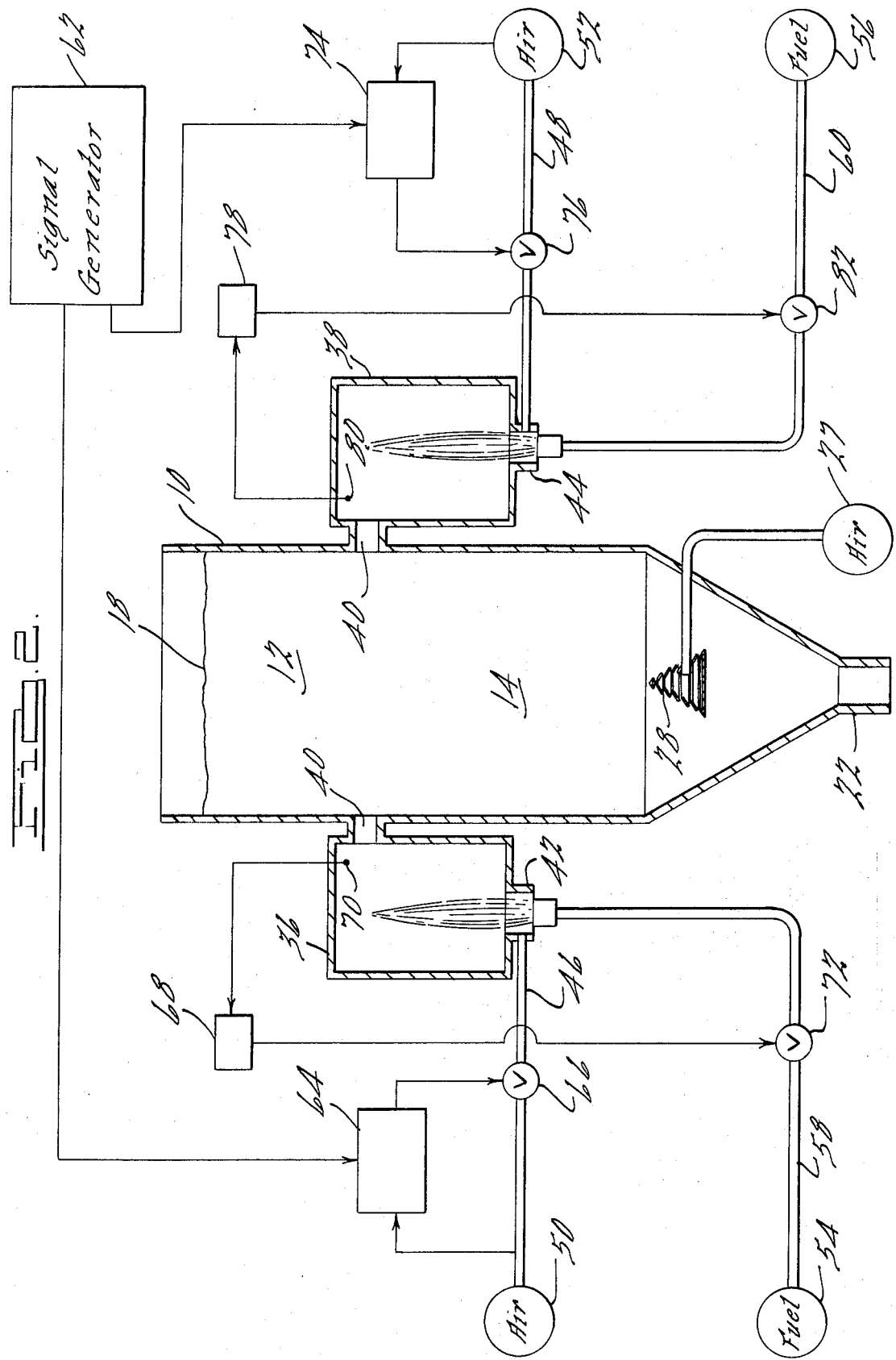

AIR FLOW CONTROL IN SHAFT FURNACES

SUMMARY OF THE INVENTION

This invention relates to the indurating of pellets of material in a shaft type indurating furnace and, more particularly, to a method and apparatus for controlling the distribution of air in the furnace to maintain uniform indurating temperatures, particularly at the upper end of the furnace.

In the indurating of materials in a shaft furnace and particularly pellets of iron ore, finely ground and balled iron ore concentrates in the form of balls or pellets are introduced in a cold state into the top of a vertically disposed furnace after which the pellets are heated to an indurating temperature and are permitted to move downwardly in the furnace under the influence of gravity. At the same time, air under pressure is introduced at lower levels of the vertical furnace to flow upwardly and countercurrently to the mass of downwardly moving, hot pellets. The air serves to cool the pellets so that they can be handled at discharge at the bottom of the furnace and, at the same time, the air absorbs the heat from the pellets as it flows upwardly. Heat for the indurating process also comes from the exothermic reaction resulting from the magnetite in the pellets which, when oxidized, give off heat that is captured by the upwardly flowing air. Also, it is usual to add air in a preheated state near the upper end of the vertical furnace. The heat for the indurating process, that is, the heat resulting from the exothermic reaction, the heat recuperated from the downwardly moving hot pellets by the upwardly moving air and the heat which is added near the upper levels of the furnace should have a uniform distribution, particularly at the indurating level of the furnace if pellets of uniform quality are to result from the process.

The problem of insuring uniform thermal treatment of the green pellets which are introduced at the top of the furnace is aggravated by a number of variables which cause variations in the temperature at different locations in a given level of the furnace. The upwardly flowing air tends to seek the coolest locations for flow which results in channeling, that is, the flow of cooler air in one location and warmer air in another, adjacent location. This condition is often initiated and aggravated by the variations in the permeability of the bed of pellets at a given level of the furnace due to variations in pellet size or accumulations of chips or fines of material. Such variables result in irregular flow and temperatures of the upwardly flowing air and once the irregular condition is initiated, it becomes more aggravated since the cold air will tend to flow to colder locations and become even colder. This effect is referred to as channeling which results in cold spots and hot spots at the indurating level and is a condition which must be minimized if a good indurated oxide pellet product is to be produced.

Although channeling could be avoided and the indurating process successfully carried out by introducing all of the air requirements in heated form, such operation would be commercially impractical because of the uneconomical use of fuel and because additional, expensive equipment would be required to cool the pellets for handling. It has been the practice to reduce the amount of heated air as much as possible and to introduce the balance of the air in a cold state at the bottom of the furnace. It has been found, however, that a reduction of the quantity of heated air much below one-third of the total air required in the process results in the undesirable channeling of air and irregular temperatures across the indurating bed at the upper end of the furnace.

It is an object of the invention to provide a method and apparatus for introducing preheated air into a vertical shaft, indurating furnace in such a manner that channel flow of air is inhibited to make for a more uniform temperature at the upper levels of the furnace where indurating takes place.

Another object of the invention is to provide a method and apparatus by which preheated air is introduced to the furnace in such a manner that the formation of channels of cold and hot air is greatly reduced, making it possible to use less heated air which results in fuel savings, and more cold air which results in a greater cooling of the pellets so that they can be more easily handled upon removal at the bottom of the furnace.

It is still another object of the invention to provide a method and apparatus by which preheated air is introduced into a vertical shaft furnace in such a manner that a greater portion of the mass of pellets comes under the influence of preheated air.

In accordance with the present invention, a predetermined quantity of air for a given period of time is introduced at an upper level in a vertical shaft indurating furnace. A portion of the air is introduced at one location and is varied over a predetermined period of time from a minimum volume to a maximum volume and in the next predetermined period of time, from a maximum to a minimum. At the same time, the balance of the preheated air is introduced at other locations at substantially the same level of the furnace and is varied in a cycle varying from a maximum to a minimum and back to a maximum so that the total quantity of air introduced in the heated form remains constant. The cycle is repeated continuously to influence a greater portion of the cross-section of the furnace with preheated air to deter the formation of channels of air at different temperatures.

BRIEF DESCRIPTION OF THE DRAWINGS

FIG. 2 is a schematic representation in flow sheet form of apparatus operable for use in the indurating process of the present invention.

DETAILED DESCRIPTION

Figure 1:
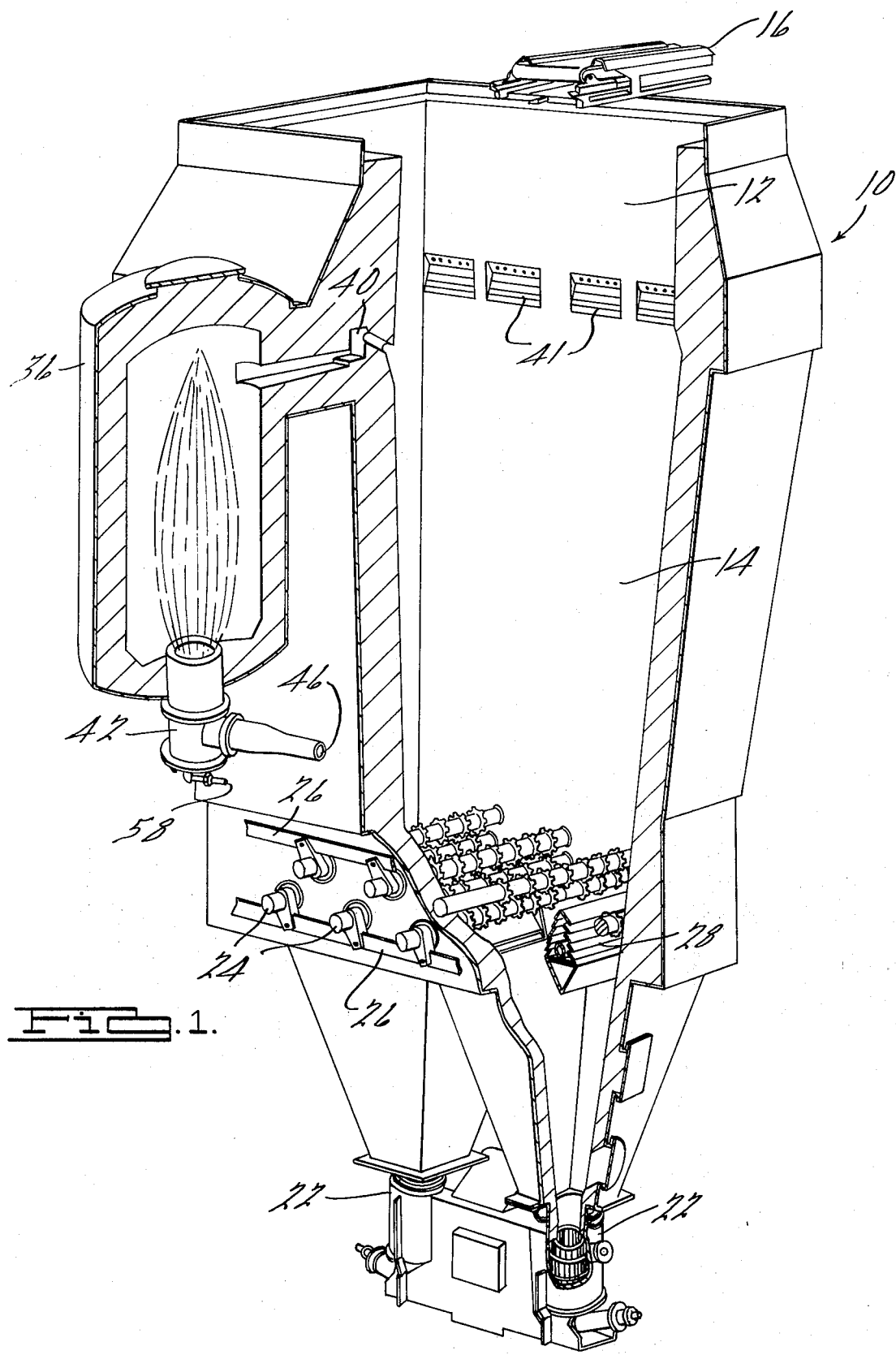
FIG. 1 is a perspective, cross-section view of a vertical shaft furnace with parts broken away.

Referring to the drawings, a vertical shaft type indurating furnace of a type well known in the art is generally designated 10. The furnace is generally rectangular in horizontal cross-section and may be considered as having two separate vertical sections made up of an upper heating stove 12 and a lower cooling stove 14. At the upper end of the furnace, a stock line feeder 16 is located which is translatable horizontally and controlled in a well known manner to deposit a layer of green, untreated pellets on the stock level or line indicated at 18 in FIG. 2. The pellets may be in the form of balled magnetite and binder and the function of the stock line feeder 16 is to uniformly distribute the green balls over the entire stock line area and to automatically correct the level of the bed of pellets in response to controls which are not shown but which also are well known in the art.

The pellets flow downwardly by gravity and are discharged at the bottom of the furnace through discharge pipes 22, best seen in FIG. 1. A plurality of agitating shafts 24 are disposed horizontally above the discharge pipes 22 and are agitated by means of links 26 at a predetermined rate to control and to assist the downward movement of the indurated pellets.

Air under pressure from a suitable source indicated at 27 in FIG. 2 is fed to the interior of the furnace through louvers 28 only one of which is shown. It should be understood, however, that a plurality of said louvers may be used to distribute air across the lower level of the furnace 10. The air is under a slight pressure, to the order of 7 psi, and tends to move upwardly in the furnace because of the constriction to air flow offered by the pipes 22 at the bottom of the furnace. The air is introduced to the furnace in a cold condition and is heated as it flows upwardly by contact with the downwardly gravitating hot pellets which, in turn, are being cooled by the upwardly moving air.

As best seen in FIG. 2, additional air is introduced to the furnace 10 in a heated condition and at a pressure to the order of 4 psi. The heated air is introduced at an upper portion of the furnace 10 between the heating stove 12 and the cooling stove 14 and at opposite sides of the furnace from combustion chambers 36 and 38. Each of the combustion chambers 36, 38 communicates with the furnace 10 through separate manifold arrangements 40 to a plurality of hot air ports 41 which can be seen in FIG. 1 and which are located around the perimeter of the furnace. The ports 41 in one half of the interior perimeter of the furnace are supplied by air from the combustion chamber 36 and the other one half of the ports 41 in the perimeter of the furnace are supplied by the combustion chamber 38. As seen in FIG. 2, air is fed to burners 42 and 44 at the bottom of the combustion chambers 36 and 38, respectively, by conduits 46 and 48 communicating with sources of air such as blowers 50 and 52. Fuel to the burners 42 and 44 is supplied from suitable sources of fuel 54 and 56 by way of conduits 58 and 60, respectively. The combustion chambers 36 and 38 serve primarily to make up the thermal losses in the indurating process and provide a means for controlling temperature distribution, particularly at the upper end of the furnace 10 near the stock line level 18.

During normal operation of an indurating pellet furnace, the residence time of the pellets within the furnace is to the order of 5 to 6 hours and it has been the usual practice to introduce approximately one-third of the air in heated form at the upper section of the furnace and the remaining two-thirds of the air through the cold air louvers 28.

Heat for the indurating process is derived from the heat exchange between the downwardly gravitating pellets and the countercurrently flowing air which tends to cool the pellets and at the same time absorbs the heat and transfers it upwardly. Additionally, hot air is supplied through the combustion chambers 36 and 38 and a third source of heat is derived from the rapid oxidation of the magnetite in the pellets. The exothermic reaction results in heat which is absorbed by the upward flowing air to increase the temperature of pellets disposed above.

During actual operation, the temperatures of the pellets and the air within the furnace are exceedingly high, particularly near the top of the pellet bed and just below the stock line 18. By way of example, pellets are discharged from the pipes 22 at a relatively cool temperature which may be to the order of 500° to 600° F. which is sufficiently low for further handling of the pellets by conveyors or the like. The temperature at the upper portion of the cooling stove 14 and below the hot air manifolds 40 and ports 41, however, may have attained a temperature to the order of 2,300° F. At a level of 1 or 2 feet below the stock line 18, the temperature may be to the order of 2,500° F. It is at this level that induration of the pellets is initiated and the air gives up its heat to the pellets so that the air is discharged from the top of the furnace at a temperature to the order of 500° or 600° or less.

During the upward flow of air, it is desirable to maintain as uniform an air-pellet temperature as possible throughout the horizontal cross-section of the furnace at any given level. However, it has been found that variations in pellet density, and heat losses through the walls of the furnace 10 create locations which may become cooler than other locations in a particular cross-sectional level of the furnace causing a non-uniform distribution in the air-pellet temperature. The tendency of the upwardly flowing air is to seek the coolest of these areas and once this phenomenon is initiated, the cool flowing air tends to cool the pellets even more and thereby attract even more cold air. This results in channeling of the upward flowing air by which is meant that shafts of relatively cool and relatively hot air are disposed adjacent to each other and result in what may be termed cold spots or hot spots at the indurating level immediately below the stock line level 18 at the upper end of the furnace. The hot spots result in excessive heat which fuses the pellets together and interferes with proper operation of the furnace and the cold spots result in improper induration of the pellets.

As pointed out before, it has been usual to introduce approximately two-thirds of the air required for the indurating process through the cold air louvers 28 and approximately one-third of the air is introduced from the combustion chambers 36 and 38. Of the heated air, it has been usual to introduce one-half from the combustion chamber 36 and the remaining one-half from the combustion chamber 38. A portion of the shaft air on its way to the stock line 18 eventually crosses the descending pellets which have been heated by the combustion air to thereby raise the temperature of the air to the desired degree.

In the method of the present invention the total combustion or heated air which is introduced into the furnace is maintained at a constant quantity for any given period of time but the amount supplied by each of the combustion chambers 36 and 38 is varied so that an increase in the amount of air from one of the combustion chambers during a given period of time is accompanied by an identical decrease in quantity during that same period of time from the other of the combustion chambers. Assuming that 35 percent of the total air required for the indurating process is to be supplied by the combustion chambers 36 and 38, and further assuming that the minimum amount of air to be supplied by any one of the combustion chambers is to be 7 percent, when the combustion chamber 36 is supplying, for example, 7 percent of the total air, the remaining amount, namely 28 percent, is being supplied by the other of the combustion chambers 38. As the percentage of air from chamber 36 is increased to 28 percent and then decreased back to 7 percent, the amount of air from the other combustion chamber 38 is simultaneously decreased from 28 to 7 percent and then back to 28 percent thereby always maintaining the total quantity of heated air which is being introduced to the furnace at a constant. The air being supplied from the combustion chambers 36 and 38 is continuously cycled in this manner over a predetermined period of time, for example, a ½ hour period in order to provide ample time for the various time controlled equipment to maintain the proper air-fuel ratio in the burners.

It should be understood, also, that the amount of 7 percent which has been referred to as a lower limit of the quantity of air supplied by the combustion chambers 36 and 38 is by way of example only and that the percentage could be more or less than 7 percent. The amount of air, however, should not be lower than that required to maintain good combustion in the combustion chambers and proper heating of the pellets disposed adjacent to the furnace wall in the area of the outlet of the combustion chambers.

The apparatus employed to control the flow of heated air from the chambers 36 and 38 through the manifolds 40 is illustrated in the flow diagram shown in FIG. 2. A signal generator 62 delivers a signal to the control system associated with the combustion chamber 36 and another, separate signal to the control system associated with the combustion chamber 38. In the embodiment shown, one of the signals varies between a minimum and a maximum value and, at the same time, the other signal decreased from a maximum to a minimum.

Referring to the control system associated with the combustion chamber 36, the signal from the signal generator 42 is delivered to a flow controller 64 which is known in the art as a cascade flow controller. Such controllers sense the rate of air flow in a conduit 46 between the source 50 and burner 42 and deliver a signal to a motor operated control valve 66 to vary the volume of air from the source 50 in accordance with a supplied signal received from the signal generator 62. As the signal varies so too does the quantity of air being delivered.

Also employed in the control system associated with the combustion chamber 36 is a temperature controlling instrument 68 which responds to the temperature in the combustion chamber 36 that is sensed by a thermocouple indicated at 70 to vary the setting of a fuel valve 72 in the line 58, between the fuel supply 54 and the burner 42. As the volume of air being delivered to the burner 42 changes, the volume of fuel will also change accordingly in order to maintain the temperature of the heated air at the level desired as determined by the temperature controlling instrument 68.

The control system which is associated with the combustion chamber 38 is identical to that associated with the combustion chamber 36 and utilizes a flow controller 74 to regulate an air valve 76 and a temperature controller 78 responding to a thermocouple 80 to regulate a fuel valve 82. The flow controller 74, however, is responsive to a different signal than the flow controller 64. Since one signal is increasing as the other is decreasing, the combined volume of air delivered by the combustion chambers 36 and 38 remains constant but the quantity delivered by one of the combustion chambers is decreasing as the volume delivered by the other of the combustion chambers is increasing. As the quantities of air delivered by the combustion chambers vary, the temperature is maintained at a substantially constant value by the control of fuel supplied through the valves 72 and 82.

The stock line 18 at the upper end of the furnace is under the influence of cool air and preheated air in approximately the same ratio as the respective quantities of air that are introduced to the furnace. For example, in a conventional vertical shaft furnace let it be assumed that 65 percent of the total air is cool air introduced at the bottom of the furnace and the remaining 35 percent is heated air introduced in equal amounts from opposite sides of the furnace and at a higher elevation in the furnace. Under such conditions, approximately 17 and ½ percent of the distance of the stock line from each side of the furnace is under the influence of preheated air and the remaining 65 percent of the stock line located centrally of the furnace is under the influence of the shaft air. In the present method and apparatus in which the preheated air is varied between a minimum and a maximum at one side of the furnace while the amount is varied from a maximum to a minimum at the other side of the furnace, the same percentages of cool and preheated air as in the prior art result in a greater percentage of the stock line being under the influence of preheated air. In the example previously given wherein the preheated air is varied between 7 and 28 percent of the total air burden, it can be seen that more than one-half of the stock line comes under the influence of preheated air during succeeding periods of time. To be more specific, the total percentage of the stock line being affected by preheated air is approximately 56 percent during a full cycle in which each of the combustion chambers 36 and 38 has delivered its maximum portion of the heated air.

As the pellets which have been heated by the combustion air introduced adjacent the opposite walls of the furnace descend through the lower stove 14, the cold pellet paths which may have been formed are disturbed and obliterated and the channeling of cold air will be eliminated to make for a uniform and desirable temperature level at the horizontal cross-section of the indurating or stock line level. The various percentages and linear lengths which have been used by way of example may be considered to be one condition of operation. However, it should be understood that operation of the combustion chambers 36 or 38 in the manner described has the desirable effect of reducing channeling and making for a more uniform temperature at the stock line which makes it possible to increase the total amount of cool air supplied through the louvers 28 at the bottom of the cooling stove 14 and, in like manner, reduce the percentage of hot air supplied by way of the combustion chambers. This results in a decrease in the amount of fuel required to heat the combustion air and, at the same time, results in reducing the temperature of the pellets being discharged through the pipes 32 so that they may be handled more conveniently and economically.

By way of example, if shaft or cool air flow is increased from 65 percent of the total required to 70 percent, the requirement for heated air would be reduced to 30 percent which is a reduction of approximately one-seventh of the total volume of heated air. This results in a proportional savings in fuel which, at the rate at which fuel is utilized, results in substantial savings which is of great importance to the commercial utilization of the process. Because of the effectiveness of the method of the present invention in minimizing channeling of the process air, the reduction of the percentage of combustion air required may be to as much as 20 percent of the total air, thereby resulting in even greater fuel savings.

Although the process and apparatus has been described in terms of the induration of pellets of iron ore materials, it should be understood that any material developing an exothermic reaction under the influence of a heated atmosphere could be utilized in the performing of the process. Moreover, the apparatus and process which has been described has been discussed in terms of using air in both cold and heated form. It should be understood, however, that with certain materials other forms of a heat exchange gas might be desirable.

It will now be seen that there has now been provided an apparatus and method by which the air is controlled and distributed in a shaft furnace in such a manner that a greater portion of the pellet bed comes under the influence of heated air than in prior art forms of furnace and process and, as a consequence, the undesirable channeling of air is minimized so that the amount of heated air can be reduced thereby resulting in fuel economies and, at the same time, the amount of cold air may be increased to better cool the pellets for more easy removal at the discharge end of the furnace.

What is claimed is:

1. In a method of indurating pellet like material which comprises flowing the material downwardly in a shaft furnace and causing heat exchange gas to flow upwardly through the furnace relative to said material, the improvement comprising heating a portion of said heat exchange gas introduced to said furnace, introducing a predetermined volume of said heated gas to said furnace over a predetermined period of time, introducing said heated gas to at least two separate locations at a given level in said furnace, said heated gas being introduced at one of said locations being varied in volume during said predetermined period of time between a minimum and a maximum.

2. The method according to claim 1 wherein said heated gas is introduced to locations at opposite sides of said furnace.

3. The method according to claim 1 wherein said heated gas introduced at said one of said locations is distributed to one-half of the perimeter of said furnace.

4. In a method of indurating pellet like material which comprises flowing the material downwardly in a vertical shaft furnace and causing heat exchange gas to flow upwardly through said furnace relative to said material, the improvement comprising heating a predetermined percentage of said heat exchange gas prior to introduction into said furnace, introducing a part of said fixed percentage of heated gas at an intermediate vertical level and at one side of said furnace, introducing the remaining part of said fixed percentage of heated gas at the opposite side of said furnace, said first mentioned part of said heated gas being varied from a minimum to a maximum amount over a predetermined period of time, and simultaneously varying said remaining part of said heated air from a maximum to a minimum amount during said predetermined period of time.

5. The method according to claim 4 wherein said heated gas is maintained at a predetermined, uniform temperature during the said predetermined period of time that said parts of said fixed percentage of heated gas are introduced to said furnace.

6. The method according to claim 4 wherein said first mentioned part of said heated gas introduced to one side of said furnace is distributed to one-half of the perimeter of said furnace and said remaining part of said heated gas is distributed to the remaining perimeter of said furnace at the other side of said furnace.

7. In a method of indurating pellet like material in a shaft type furnace comprising establishing a gravitationally descending mass of pellet like material in initially unheated form, removing indurated pellets from the bottom of said mass and replacing pellets in unheated form at the top of said mass to maintain the height of the latter, continuously introducing heat exchanged gas in an unheated state to the bottom portion of said mass of pellets, simultaneously introducing heat exchanged gas in a heated state to an intermediate level and at opposite sides of said mass, said heated and unheated heat exchange gas being maintained at a predetermined substantially constant volume for a given period of time, a portion of said heated heat exchange gas being introduced at one side of said mass and being varied in volume from a predetermined minimum up to a maximum and back to a minimum during said given period of time and the remaining portion of said heated heat exchange gas being introduced at the other side of said mass and being varied in volume from a predetermined maximum down to a minimum and back to a maximum during said given period of time.

8. The method of claim 7 in which the volume of said heated heat exchange gas introduced during said given period of time is substantially lower than the volume of said unheated heat exchange gas.

9. The combination set forth in claim 8 in which said heated heat exchange gas is between 20 and 35 percent of said predetermined substantially constant volume of heat exchange gas.

10. Apparatus for distributing heat exchange gas to a bed of pellet like material in a shaft furnace comprising, in combination, a shaft type indurating furnace comprising an upper heating stove and a lower cooling stove, first and second sources of heated gas, first and second manifold means operatively connecting said first and second sources of heated gas with separate portions of said furnace intermediate said upper and said lower stoves, respectively, control means operatively associated with said first manifold means and operative to vary the quantity of heated gas between a minimum and a maximum quantity, second control means operatively associated with said second manifold means and operative to vary the quantity of heated gas between a maximum and a minimum in inverse proportion to the quantity of heated gas introduced through said first manifold means, said first and second control means being operatively associated with each other to maintain the quantity of said heated gas delivered through said first and second manifold means constant.

11. The combination set forth in claim 10 in which said heated gas is introduced at super atmospheric pressure.

* * * * *